US011295526B2

(12) United States Patent
De Preter

(10) Patent No.: US 11,295,526 B2
(45) Date of Patent: Apr. 5, 2022

(54) METHOD FOR CREATING AN INTERACTIVE VIRTUAL TOUR OF A PLACE

(71) Applicant: NODALVIEW, Rixensart (BE)

(72) Inventor: Pierre De Preter, Rixensart (BE)

(73) Assignee: NODALVIEW, Rixensart (BE)

(*) Notice: Subject to any disclaimer, the term of this patent is extended or adjusted under 35 U.S.C. 154(b) by 0 days.

(21) Appl. No.: 17/282,414

(22) PCT Filed: Oct. 2, 2018

(86) PCT No.: PCT/EP2018/076864
§ 371 (c)(1),
(2) Date: Apr. 2, 2021

(87) PCT Pub. No.: WO2020/069732
PCT Pub. Date: Apr. 9, 2020

(65) Prior Publication Data
US 2021/0383608 A1    Dec. 9, 2021

(51) Int. Cl.
*G06T 19/00* (2011.01)
*G06T 3/40* (2006.01)
*G06T 15/20* (2011.01)

(52) U.S. Cl.
CPC .......... *G06T 19/003* (2013.01); *G06T 3/4038* (2013.01); *G06T 15/205* (2013.01); *G06T 2200/08* (2013.01)

(58) Field of Classification Search
None
See application file for complete search history.

(56) References Cited

U.S. PATENT DOCUMENTS 6,337,688 B1 *   1/2002   Berstis ................. A63F 13/10
                                                                345/473
9,349,195 B2 *   5/2016   Stams ................. G01C 11/02
(Continued)

FOREIGN PATENT DOCUMENTS

| CH | 707185 A2 | 5/2014 |
| EP | 2192501 A1 | 6/2010 |
| EP | 2779626 A1 | 9/2014 |

OTHER PUBLICATIONS

International Search Report issued in corresponding application No. PCT/EP2018/076864, dated May 10, 2019.

*Primary Examiner* — Robert Bader
(74) *Attorney, Agent, or Firm* — Murtha Cullina LLP

(57) ABSTRACT

The invention is a method and system for creating an interactive virtual tour. The invention performs consecutive shooting sessions for capturing angularly spaced images of a place or property using a mobile terminal. Each session is performed by rotation of the terminal at a different location of the property, the terminal collects its orientation when capturing the first image of each session and generates for each session a panorama projection ($P_1$-$P_n$) by automatically assembling captured images. After the first session each further session is performed by directing the terminal so that the first image of the session is substantially centered on a previous location. The collected orientation at the direction is used to create a linking vector between the first images of the further and previous sessions. The vectors are used to create interactive browsing capability upon assembly of the projections within an interactive virtual tour.

13 Claims, 1 Drawing Sheet

(56) References Cited

U.S. PATENT DOCUMENTS

| | | | |
|---|---|---|---|
| 2006/0250389 A1* | 11/2006 | Gorelenkov | G06T 15/205 |
| | | | 345/419 |
| 2008/0143727 A1* | 6/2008 | Oh | G06T 13/20 |
| | | | 345/474 |
| 2013/0271462 A1 | 10/2013 | Frank | |
| 2015/0310596 A1* | 10/2015 | Sheridan | G06K 9/00476 |
| | | | 382/284 |

* cited by examiner

METHOD FOR CREATING AN INTERACTIVE VIRTUAL TOUR OF A PLACE

This application claims the benefit of International application number PCT/EP2018/076864, filed Oct. 2, 2018 the entire contents of which is incorporated herein by reference.

TECHNICAL FIELD

The invention relates to a method for creating an interactive virtual tour of a place, as well as a system for implementing such a method.

It applies in particular to virtual visits of places such as real-estate properties, especially apartments, houses or professional premises located in a building, but it can also apply to other types of places, such as boats or outside places.

To facilitate the work of real estate agents, there exist solutions for allowing the creation of interactive virtual tours of real-estate properties to be rent or bought by means of captured images of the real-estate properties, so as to allow a user to virtually visit the real-estate property through interactive browsing of the virtual tour.

Thus, real-estate agents can easily present real-estate properties to a great number of potential renters or buyers, in particular without planning physical displacements to the real-estate properties, which is particularly advantageous for customers that live far from the real-estate properties.

Some of the existing solutions provides for capturing images of the real-estate property through several 360° shooting sessions, and to create a virtual tour by photogrammetry, eventually completed with distance-measuring apparatuses, such as a laser or an infrared sensor.

A solution is known which provides for using photogrammetry only, without the use of additional measuring apparatuses, and provides to do so to perform several shooting sessions that are relatively very close from each other, notably with a relative distance of at most one or two meters between two adjacent shooting sessions.

Another known solution provides for assembling a virtual tour by means of photogrammetry completed with infrared sensors and/or laser sensors.

These solutions require a very tight mesh of 360° panoramas, with relative distances between two adjacent panoramas not greater than 1 or 2 meters, for ensuring a reliable assembling of the panoramas. Thus, to ensure a correct visual continuity during the browsing into the final virtual tour, these solutions require a lot of different shooting sessions, and notably additional shooting sessions during passages between two rooms or behind elements that may hinder the visibility, such as wall corners or furniture.

However, these constraints are cumbersome and time-consuming for real-estate agents, which generally prefer to focus only on the points of interest of the properties to be visited. In particular, the transitions between two rooms separated by a long corridor may require uninteresting and time-wasting multiple shooting sessions within the corridor.

Moreover, there exist other solutions that provide a computing platform to allow a user to create such a virtual tour from 360° panoramas, but these solutions also require a manual assembly by the user of consecutive 360° panoramas to one another to perform such a creation, which takes a lot of time and sometimes requires computer knowledge from the user.

SUMMARY OF THE INVENTION

The invention aims to improve the prior art by proposing a solution for allowing to create an accurate interactive virtual tour of a place in a simple and reliable manner, and notably with a reduced number of shooting sessions.

For that purpose, and according to a first aspect, the invention relates to a method for creating an interactive virtual tour of a place for allowing a user to virtually visit the place through interactive browsing of the virtual tour, the method providing for:

performing n consecutive shooting sessions, n being a natural number at least equal to 2, for capturing m angularly spaced images of the place by means of a mobile terminal, each of the shooting sessions being performed by rotation of the mobile terminal at a different location of the place, the mobile terminal comprising means for collecting its orientation when capturing the first image of each shooting sessions;

generating, for each of the consecutive shooting sessions, a panorama projection by automatically assembling captured images of the shooting session;

wherein after the first shooting session at the first location, each further shooting session is performed by directing the mobile terminal so that the first image of the session is substantially centered on a previous location, the collected orientation at the direction being used to create a linking vector between the first images of respectively the further session and the previous session, the linking vectors being used to create interactive browsing means upon assembly of the panorama projections within an interactive virtual tour.

According to a second aspect, the invention relates to a system for implementing such a method for creating an interactive virtual tour of a place, the system comprising a mobile terminal which comprises:

means for capturing the m angularly spaced images of the place during the n consecutive shooting sessions;

rotation sensor means for collecting the orientation of the mobile terminal when capturing the first image of each shooting session;

visor means for directing further shooting sessions on a previous location;

an application comprising means for sending the captured images and the collected orientations to a platform of the system;

the platform comprising:

means for assembling captured images of a shooting session into a panorama projection;

means for creating the linking vectors from the collected orientations;

means for assembling the panorama projections within an interactive virtual tour with interactive browsing means;

means for displaying the interactive virtual tour, so as to allow a user to virtually visit the place through interactive browsing of the virtual tour.

BRIEF DESCRIPTION OF THE DRAWINGS

Other aspects and advantages of the invention will become apparent in the following description made with reference to the appended figures, wherein.

DETAILED DESCRIPTION

Figure 1:
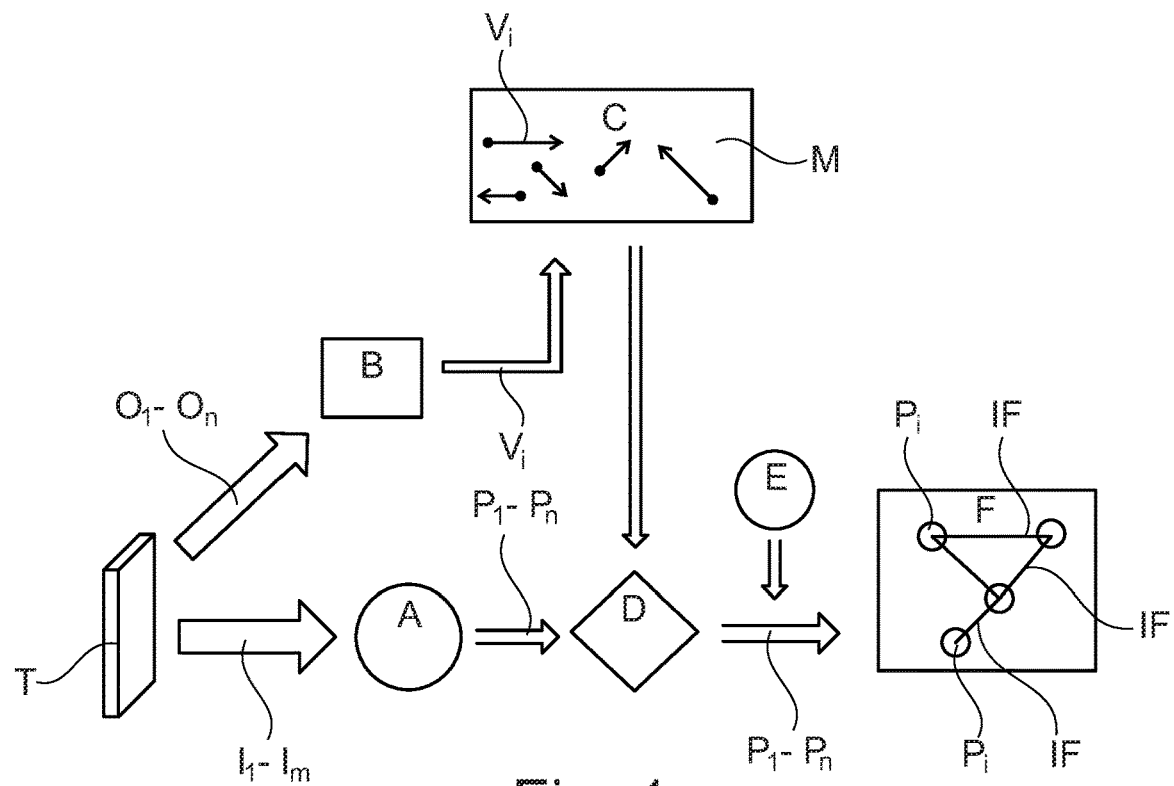
FIG. 1 represents schematically the different steps of a method according to an embodiment of the invention.
Figure 2:
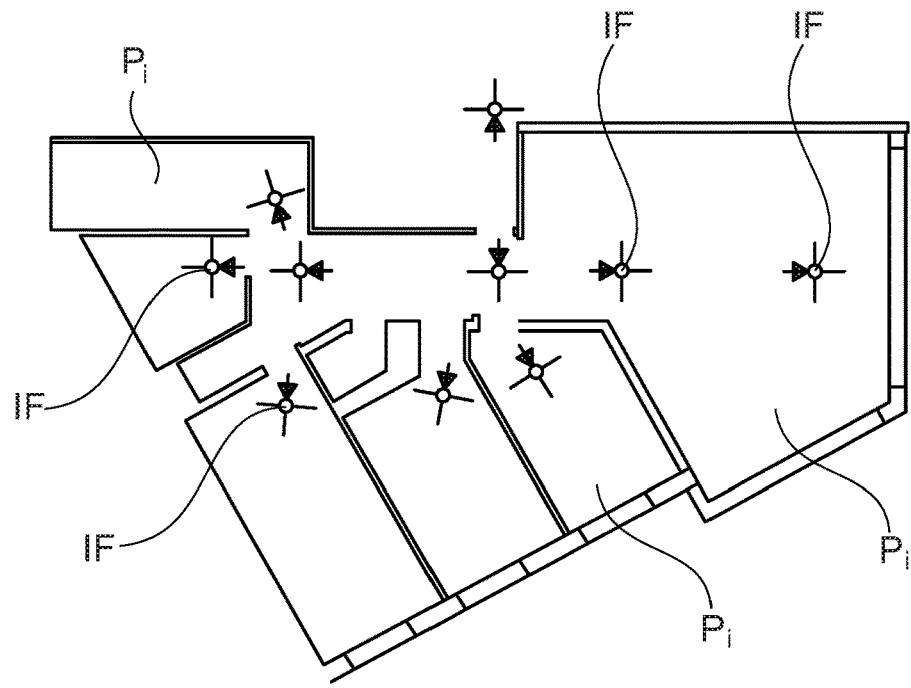
FIG. 2 represents schematically a plan in top view of an interactive virtual tour created by the method of FIG. 1.

In relation to those figures, we describe below a method for creating an interactive virtual tour of a place, as well as a system for implementing such a method, for allowing a user to virtually visit the place through interactive browsing of said virtual tour.

The place can be in particular a real-estate property, such as an apartment, a house or professional premises located in a building, the user being a potential buyer or renter for the real-estate property, or a real-estate agent who wants to present the real-estate property to a customer.

The place can also be of another type, such as for example a boat or any outside place.

The system comprises a mobile terminal T, such as for example a smartphone, that is equipped with integrated camera and sensors, as well as a platform which can be implemented into a server connected to a Local Area Network (LAN) or a Wide Area Network (WAN). Advantageously, the mobile terminal T comprises means for communicating with the platform through a wireless communication protocol, such as the Wi-Fi protocol or a Cellular Data protocol, especially of the third generation (3G), the fourth generation (4G) or the fifth generation (5G).

The method provides for performing n consecutive shooting sessions $S_1$-$S_n$, n being a natural number at least equal to 2, for capturing m angularly spaced images $I_1$-$I_m$ of the place by means of the mobile terminal T, which is equipped for that purpose with appropriate image capturing means, for example an integrated camera.

To implement the method, the mobile terminal T also comprises a dedicated application, which can be downloaded by the user of the mobile terminal from a dedicated application purchasing service, such as for example Google Play® or App Store®.

Each shooting session $S_1$-$S_n$ is performed by rotation of the mobile terminal T at a different location $L_1$-$L_n$ of the place, for example different rooms of a real-estate property, or different points within a same large room, such as for example a long corridor, a dining room or the main hall of a building.

During a shooting session $S_1$-$S_n$, the mobile terminal T is immobile in relation to the corresponding location $L_1$-$L_n$ of the place, and only rotates around a vertical axis along an angular course of about 360°. To do so, the system comprises a tripod, such as the apparatus provided by the Nodalview® company, with a rotating head on which the mobile terminal T can be mounted, the head being adapted to rotate the mobile terminal T at 360° during a shooting session $S_1$-$S_n$, either by manual or motorised rotation of the head around the vertical axis.

Advantageously, images are captured automatically by the mobile terminal T. To do so, the application can comprise means for interacting with the image capturing means of the mobile terminal T to automatically launch the image capturing means at the beginning of the rotation of the mobile terminal, so as to automatically capture images during the rotation. In particular, the application can be adapted to use information provided by rotation sensor means implemented on the mobile terminal T to launch the interaction means.

In particular, the rotating head of the tripod is adapted for allowing capture of the m images spaced from one another by a constant angular interval, preferably with a little value, so as to obtain an sufficient number of images for each shooting session $S_1$-$S_n$. For example, the constant angular interval may be of about 45°, which allows to obtain about 8 images per shooting session $S_1$-$S_n$.

To that effect, when used with a motorised rotating head, the mobile terminal T can be adapted to command the rotation of the head, and to temporarily stop the rotation after each movement of the mobile terminal along the predefined angular interval. To do so, when the rotation sensor means detect the achievement of a movement along the angular interval, the mobile terminal T can send an appropriate signal to launch the image capturing means upon such a rotation stop.

The mobile terminal T also comprises means for collecting its orientation $O_1$-$O_n$ at least when capturing the first image $I_1$ of each shooting session $S_1$-$S_n$, and preferably all along the shooting session, such collection means being for example rotation sensor means as presented hereinabove.

Moreover, the method provides that, after the first shooting session $S_1$ at the first location $L_1$, each further shooting session $S_i$ is performed by directing the mobile terminal T so that the first image $I_1$ of the session is substantially centered on a previous location $P_j$. To do so, the mobile terminal T comprises visor means adapted for such a direction.

For simplifying the achievement of the method, each further orientation $O_i$ can be determined incrementally compared to the former orientation $O_{i-1}$, i.e. the orientation $O_{i-1}$ of the mobile terminal T during the preceding shooting session $S_{i-1}$. To do so, the application can comprise means for registering consecutive orientations $O_1$-$O_n$ of the mobile terminal T according to such an incrementation.

Moreover, the collected orientation $O_1$ of the first shooting session $S_1$ can be set as a reference direction, notably for the further shooting sessions $S_2$-$S_n$. To do so, the application can be adapted to do such a registration.

In the same way, each further shooting session $S_i$ can be performed by directing the mobile terminal T so that the first image $I_1$ of the session is substantially centered on the former location $L_{i-1}$. In particular, the user of the mobile terminal T can place the mobile terminal at the further location $L_i$ so as to approximately orient the mobile terminal towards the former location $L_{i-1}$ before starting the further shooting session $S_i$, notably by using the visors means described hereinabove.

Otherwise, in particular when the spatial arrangement of the room does not allow to perform a centering on the former location $L_{i-1}$, the first image $I_1$ of the further shooting session $S_i$ can be instead centered on a previous location $L_j$ which is visible from the current location $L_i$ while being sufficiently close therefrom.

The method can provide for collecting the number j of the previous location $L_j$. To do so, the application comprises dedicated means which are adapted in particular for registering:

by default, the number i-1 of the former location $L_{i-1}$; or
  a manual entering of the number j by the user of the mobile terminal T on a graphical user interface (GUI) of the application, notably in the case when a centering on the former location was impossible.

For a more intuitive registering of the sessions $S_1$-$S_n$, the method can also provide for collecting a dedicated label corresponding to the name of the corresponding location $L_1$-$L_n$, such as for example "living room", "kitchen" or "entrance". To do so, the application can comprise means for allowing the user to manually enter such a label after the achievement of a shooting session $S_1$-$S_n$.

Advantageously, the application can comprise means for processing in real-time visual parameters of the captured images to improve their quality, the parameters comprising for example the resolution, the brightness, the focus or the white balance. In particular, the application can comprise High-Dynamic-Range Imaging (IDRI) processing means, which are particularly adapted to function in parallel to pattern matching algorithms.

The application further provides means for sending the captured images $I_1$-$I_m$ and the collected orientations $O_1$-$O_n$ to the platform of the system. In particular, the sending means of the application can be adapted to automatically send the captured images $I_1$-$I_m$ and the collected orientations $O_1$-$O_n$, for example through a wireless communication according to the Wi-Fi protocol or a Cellular Data protocol, especially of the third generation (3G), the fourth generation (4G) or the fifth generation (5G).

In relation to FIG. 1, the method provides a step A for generating, for each of the consecutive shooting sessions $S_1$-$S_n$, a panorama projection $P_1$-$P_n$ by automatically assembling images captured during the shooting session. To do so, the platform comprises means for assembling images $I_1$-$I_m$ of a shooting session $S_1$-$S_n$ into such a panorama projection $P_1$-$P_n$.

The panorama projections $P_1$-$P_n$ are in particular equirectangular 360° panorama projections, which allows to benefit from an accurate representation of the corresponding location $L_1$-$L_n$ in the final interactive virtual tour.

The method provides for processing each generated panorama projection $P_1$-$P_n$ in order to align the centre of the panorama projection with the centre of the first image $I_1$ captured during the corresponding shooting session $S_1$-$S_n$. To do so, the platform comprises means that are adapted to achieve such an alignment process, for example by means of a Control Point Matching (CPM) algorithm, in particular the Speeded Up Robust Features (SURF) Control Point Detection algorithm.

The method also provides a step B, notably in parallel of step A, wherein, for each further shooting session $S_i$, the collected orientation $O_i$ at the direction of the mobile terminal T is used to create a linking vector $V_i$ between the first images $I_1$ of respectively the further session and the previous session $S_i$ on which the further session was centered. To do so, the platform comprises means for creating such linking vectors $V_i$ from the collected orientations $O_i$.

The method then provides a step F for assembling the panorama projections $P_1$-$P_n$ within an interactive virtual tour, the linking vectors $V_i$ being used to create interactive browsing means IF upon the assembly. To do so, the platform comprises means for automatically performing such an assembly.

Thus, the method can replace automatically the panorama projections $P_1$-$P_n$ in relation to one another and to generate automatically interactive browsing means IF for allowing transitions therebetween, notably without the use of additional and complex location data measurement technologies. Moreover, the automatic assembly of the interactive virtual tour allows to facilitate the work of real-estate agents and employees of real-estate agencies.

The method also provides a step C for creating a calibration matrix M from the linking vectors $V_2$-$V_n$, the calibration matrix being used to create interactive browsing means IF between panorama projections $P_1$-$P_n$ not directly linked by a vector $V_2$-$V_n$. To do so, the platform comprises means for creating such a calibration matrix M, in particular before the final virtual tour assembly step F.

The method also provides a step D for calibrating the panorama projections $P_1$-$P_n$ with the matrix M created during step C, so that all of the panorama projections are linked two by two before their final assembly within the interactive virtual tour.

The interactive browsing means IF can be in the form of transition arrows with which the user can interact for switching from a panorama projection $P_1$-$P_n$ to another one within the interactive virtual tour, and then to have a fluid overview of the place as if he was physically circulating between locations of interest thereof.

The interactive browsing means IF can be each defined by at least one of the following data:
vertical and horizontal coordinates of the interactive browsing means;
information about the panorama projection $P_1$-$P_n$ linked to the interactive browsing means; and
vertical and horizontal coordinates of an entry view or an exit view of the panorama projection. In particular, in the case of browsing means IF from a panorama projection $P_i$ to a previous panorama projection $P_j$, the entry view corresponds to the centre of the first image $I_1$ of the panorama projection $P_i$.

The platform further comprises means for displaying the interactive virtual tour, so as to allow a user of the platform to virtually visit the place through interactive browsing of the interactive virtual tour.

In particular, the platform can comprise means for implementing a Graphical User Interface (GUI), for example a Web page for the real-estate agency, wherein a user can access to the interactive virtual tour of the real-estate property he is interested in to perform the virtual visit thereof, notably by interacting with the arrows IF for switching between the panorama projections $P_1$-$P_n$ of each room of the real-estate property.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to assist the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. A method for creating an interactive virtual tour of a place for allowing a user to virtually visit the place through interactive browsing of the virtual tour, the method providing for:
performing n consecutive shooting sessions ($S_1$-$S_n$), n being a natural number at least equal to 2, for capturing angularly spaced images of the place using of a mobile terminal, each of the shooting sessions being performed by rotation of the mobile terminal at a different location of the place, the mobile terminal configured for collecting its orientation when capturing the first image of each shooting sessions;
generating, for each of the consecutive shooting sessions, a panorama projection by automatically assembling captured images of the shooting session;
wherein after a first shooting session at the first location, each further shooting session is performed by presenting a visual guide directing the user to orient the mobile terminal so that the first image of the further session is substantially centered on a previous location, the collected orientation at the direction being used to create a linking vector between the first images of respectively the further session and the previous session, the linking vectors being used to create interactive browsing means upon assembly of the panorama projections within an interactive virtual tour.

2. The method according to claim 1, wherein each further orientation is determined incrementally compared to the former orientation.

3. The method according to claim 1, wherein each further shooting session is performed by directing the mobile terminal the first image of the further session is substantially centered on the former location.

4. The method according to claim 1, wherein it provides for creating a calibration matrix from the linking vectors, the calibration matrix being used to create interactive browsing between the first images of respectively a further session and a previous session not directly linked by a linking vector.

5. The method according to claim 1, wherein it provides for collecting the number j of the previous location.

6. The method according to claim 1, wherein the collected orientation of the first shooting session is set as a reference direction.

7. The method according to claim 1, wherein the panorama projections are equirectangular 360° panorama projections.

8. The method according to claim 1, wherein it provides for processing each generated panorama projection in order to align the centre of the panorama projection with the centre of the first image captured during the corresponding shooting session.

9. The method according to claim 8, wherein it provides for achieving the alignment process of a panorama projection by means of a Control Point Matching algorithm, in particular the Speeded Up Robust Features Control Point Detection algorithm.

10. The system for implementing a process according to claim 1 for creating an interactive virtual tour of a place, the system comprising a mobile terminal which comprises:

- a capturer for capturing the angularly spaced images of the place during the consecutive shooting sessions;
- a rotation sensor for collecting the orientation of the mobile terminal when capturing the first image of each shooting session;
- a sending application for sending the captured images and the collected orientations to a platform of the system;

the platform comprising;

- an image assembler for assembling captured images of a shooting session into a panorama projection;
- a vector creator for creating the linking vectors from the collected orientations;
- a projection assembler for assembling the panorama projections within an interactive virtual tour with interactive browsing means;
- a display for directing the user to orient further shooting sessions on a previous location and for displaying the interactive virtual tour, to allow a user to virtually visit the place through interactive browsing of the virtual tour.

11. The system according to claim 10, wherein the sending application comprises means for collecting the number of the previous location.

12. The system according to claim 10, wherein the platform comprises a matrix creator for creating a calibration matrix from the linking vectors, the calibration matrix being used to create interactive browsing between the first images of respectively a further session and a previous session not directly linked by a vector.

13. The system according to claim 10, wherein it comprises a tripod with a motorised or manually rotatable head on which the mobile terminal is mounted, the rotatable head being adapted for rotating the mobile terminal around a vertical axis and for allowing capture of the images spaced from one another by a constant angular interval.

* * * * *